Patented Mar. 16, 1926.

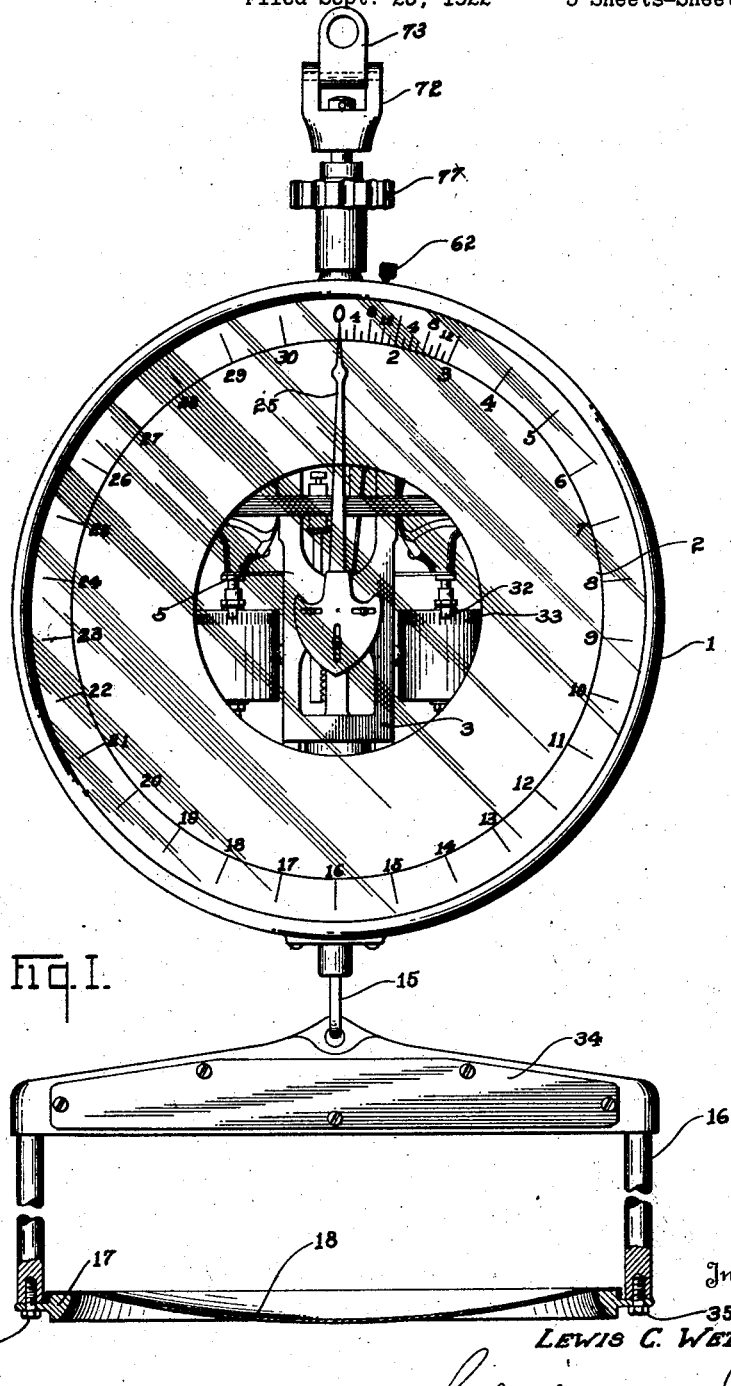

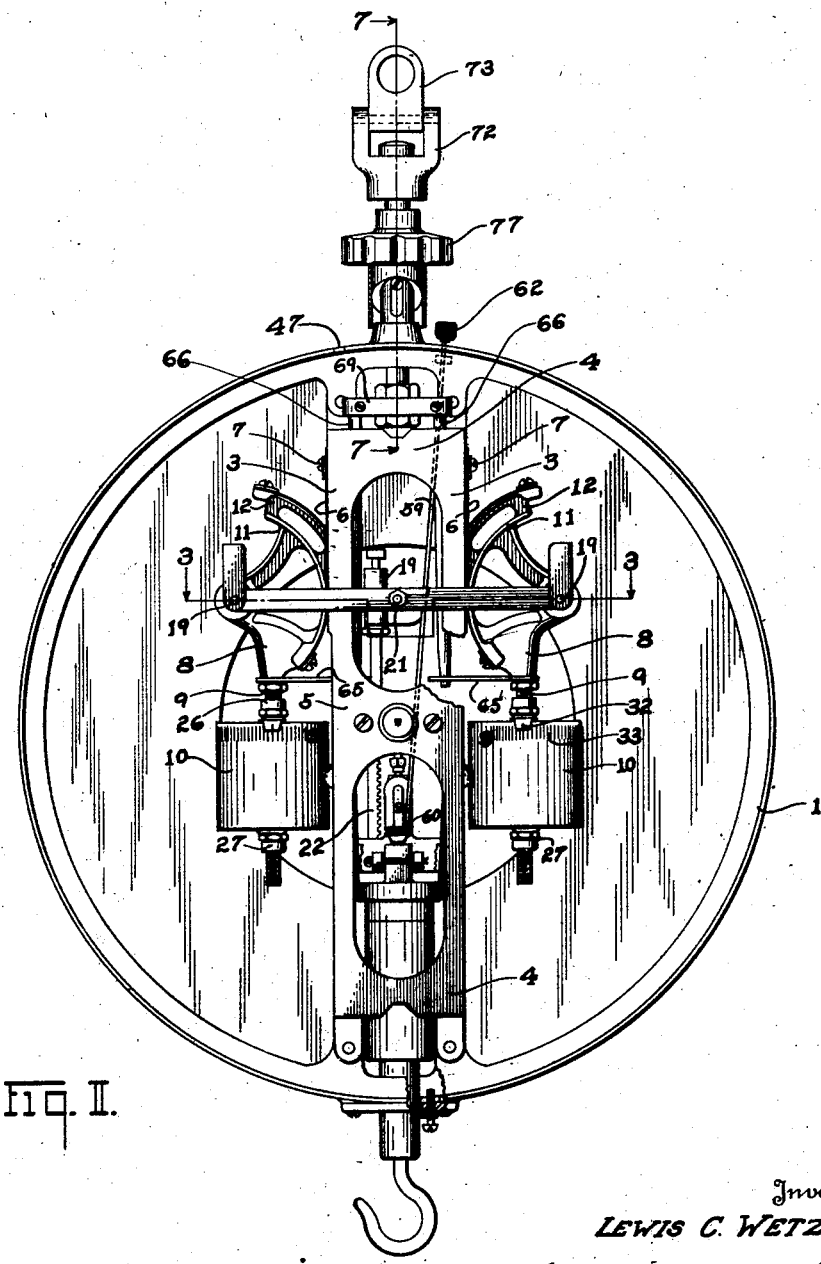

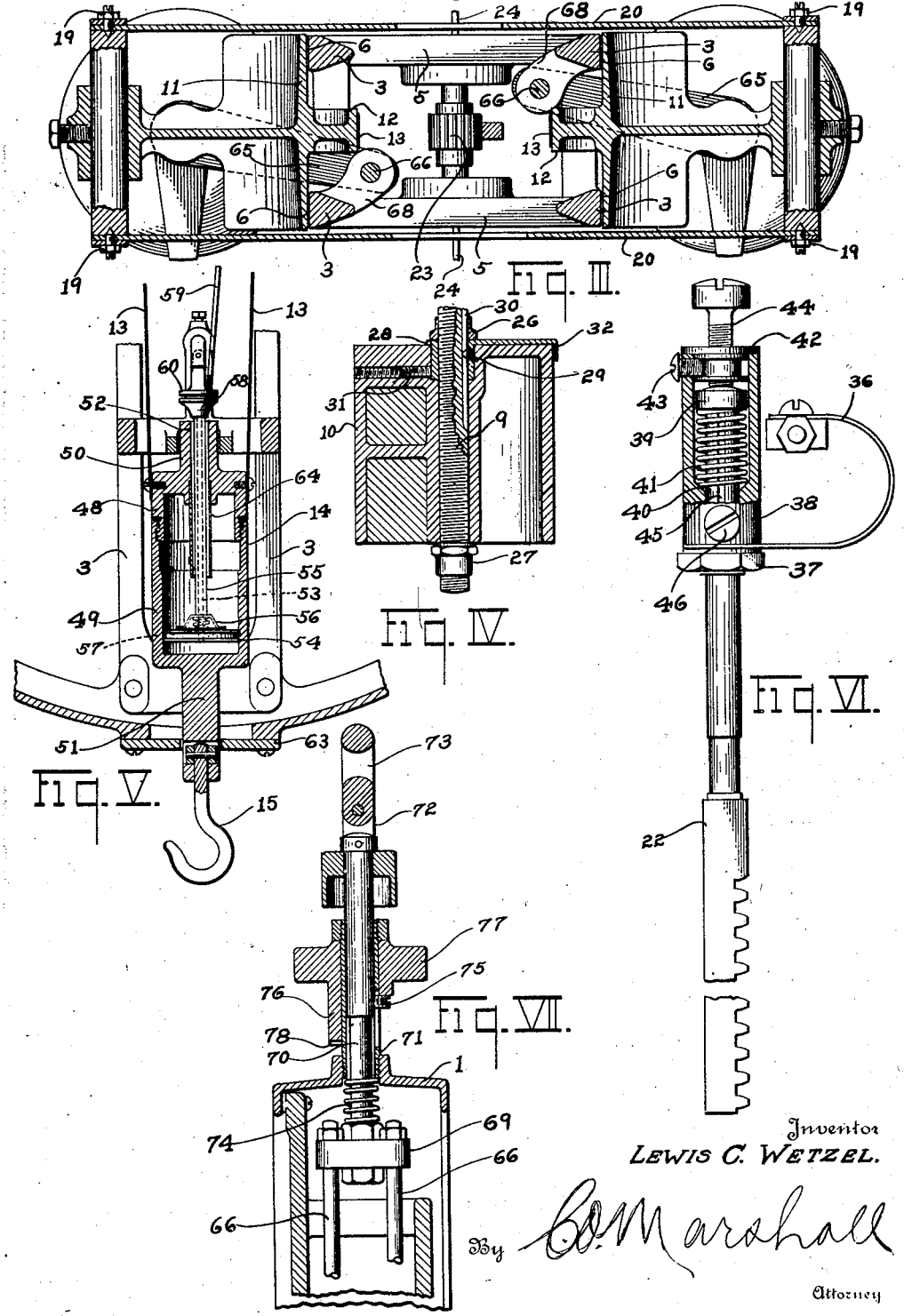

1,577,009

UNITED STATES PATENT OFFICE.

LEWIS CALVIN WETZEL, OF WINDSOR, ONTARIO, CANADA, ASSIGNOR TO TOLEDO SCALE COMPANY, OF TOLEDO, OHIO, A CORPORATION OF NEW JERSEY.

WEIGHING SCALE.

Application filed September 25, 1922. Serial No. 590,231.

*To all whom it may concern:*

Be it known that I, LEWIS C. WETZEL, a citizen of the United States, residing at Windsor, Province of Ontario, Canada, have invented certain new and useful Improvements in Weighing Scales, of which the following is a specification.

This invention relates to weighing scales of the type having load-counterbalancing pendulums, and some of its features are particularly applicable to hanging scales such as are used in market stalls and upon hucksters' wagons, and I have therefore illustrated the invention as embodied in a hanging scale of this kind.

One of the objects of the invention is to provide a scale without multiplying levers in which the pendulums are neither so long nor so heavy as to render the mechanism excessively liable to damage by shocks and jars such as are incident to its being carried on a wagon or to its being taken from its supporting hook and moved about.

Another object of the invention is the provision of reliable and efficient means whereby the pendulums may be manually locked against movement and means for automatically bringing such locking means into operation when the scale is removed from its support.

Another object is the provision of improved means for adjusting the pendulum mechanism.

Another object is the provision of improved means for regulating the vibration of the weighing mechanism.

And still another object is the provision of an improved commodity-receiving support particularly adapted for use with my improved weighing scale.

Other objects and advantages will be apparent from the following description, in which reference is had to the accompanying drawings illustrating a preferred embodiment of my invention and wherein similar reference numerals designate similar parts throughout the several views.

In the drawings:

Figure I is a front elevation of a scale embodying my invention, parts being broken away and parts shown in section;

Figure II is a slightly enlarged elevational view with the commodity-receiving support and the obverse hand and dial removed;

Figure III is an enlarged detail sectional plan view taken substantially on the line III—III of Figure II.

Figure IV is an enlarged vertical sectional view through one of the load-counterbalancing pendulum weights;

Figure V is a similar view showing the vibration regulating device;

Figure VI is an elevational view of a rack forming an element of the scale of my invention;

Figure VII is an enlarged vertical sectional view taken substantially on the line VII—VII of Figure II.

Referring to the drawings in detail, the load-offsetting and indicating mechanisms are housed in a substantially watch-casing-shaped housing 1, the obverse and reverse sides of which are glazed to display charts 2 which are fixed within the housing 1.

Secured within the housing 1 is an upright frame consisting of four posts 3 which are connected at their upper and lower ends by cross members 4 and at their centers by bridges 5.

The upper portions of the laterally facing vertical sides of the posts 3 are smooth and plane, and overlying them are strips 6 of flexible metallic ribbon, the upper ends of the strips of metallic ribbon being secured, as at 7, to the posts 3. The strips of metallic ribbon 6 support a pair of load-counterbalancing pendulums, each of which comprises a cast center 8, a stem 9 and a weight 10. The center 8 includes a curved part or sector 11, adjacent the lower edge of which are secured the lower ends of a pair of the flexible strips 6, so that the pendulum is suspended with its sector 11 facing, and in position to rock upon, the adjacent vertical sides of the posts 3, the supporting strip being interposed, as shown in Figures II and III, between the curved and flat surfaces.

Projecting from the curved surface of the sector 11 is a sector 12 of greater radius which is eccentric with respect to the sector 11, and overlying and depending from the sector 12 is a flexible metallic ribbon 13. A like ribbon 13 depends from the other pendulum, and the lower ends of the ribbons are connected to a dash pot 14, which is in turn connected by means of a hook 15 and a bail 16 and a supporting ring 17 to a commodity-receiving platter 18.

It will be apparent to those skilled in the art that when a load is placed upon the platter 18 the ribbons 13 will be pulled downwardly and the pendulum weights 10 will be swung outwardly and upwardly, the sectors 11 rolling upwardly over the faces of the posts 3. The sectors 12 thus constitute power sectors and the sectors 11 fulcrum sectors, while the posts 3 constitute sector guides. These parts will be so denominated hereinafter.

Pivotally attached, as 19, to the pendulum centers 8 on axes passing through the centers of curvature of the fulcrum sectors and perpendicular to the planes of movement of the pendulums is a compensating frame 20 which moves vertically upwardly as the pendulums swing outwardly, and pivotally connected at 21 to the frame 20 on an axis which lies midway between the pivots 19 is a rack 22 meshing with a pinion 23 that is fixed upon a shaft 24, the shaft 24 being journaled in the bridges 5 and carrying at its ends indicator hands 25.

When a load is placed upon the platform and the pendulums swing outwardly, the rack 22 is moved vertically upwardly, thus turning the pinion 23 and shaft 24 and causing the hand 25 to swing over the chart.

Owing to the relative eccentricity of the fulcrum sectors 11 and power sectors 12, when the parts are properly proportioned and adjusted, the upward movement of the frame 20 and rack 22 and the consequent movement of the hands 25 over the chart 2 are proportional to the amount of weight added upon the commodity receiver. The graduations on the chart may, therefore, be equally spaced. Correct indications will not be obtained, however, unless the pendulums are of the proper weight and their centers of mass are properly positioned both vertically and laterally. If the centers of mass of the pendulums are too low, the pendulums will not swing far enough, and if the centers of mass are too high, they will swing too far in counterbalancing a given load. In order, therefore, that the centers of mass of the pendulums may be properly positioned vertically, the stems 9 are threaded and the weights 10 are slidably mounted thereon, adjusting and retaining nuts 26 and 27 being threaded upon the stems above and below the weights.

If the proper parts of the power and fulcrum sectors are not brought into use as the pendulums swing outwardly, the hands 25 will not move equal distances for equal increments of load. Since, when the platter is empty the center of mass of each pendulum remains at a definite horizontal distance from a point directly below the vertical portion of the metallic strip supporting the pendulum, which distance is that at which the downward pull on the ribbon 13 is counterbalanced by the weight of the pendulum, it is apparent that if some of the mass of the pendulum be shifted outwardly the pendulum as a whole will swing inwardly until equilibrium is restored. This swinging of the pendulum not only moves the hand 25 from its zero position, but it rolls the power and fulcrum sectors downwardly so that a different part of the curve of the power sector will come into use in weighing from zero to full capacity. The opportunity for adjustment thus afforded has been taken advantage of by loading one side only of the pendulum weight and so mounting it that it may be turned about the stem 9 and locked in any selected position.

By reference to Figure IV it will be seen that the upper end of the weight 10 is counterbored to receive a small collar 28, which is prevented from rotating about the stem 9 by means of a small screw 29 having a pointed end projecting into a longitudinal groove 30 in the stem 9. The collar may, however, be moved lengthwise of the stem with the weight 10 by manipulation of the nuts 26 and 27.

A set screw is threaded into the weight 10 and fits against the collar, so that when the screw is turned up the collar and weight are firmly secured together. When, however, the screw 31 is released, the weight may be turned on the stem and collar. A pointer 32, which is rigid with the collar, indicates by co-operation with a series of graduations 33 on the weight 10 the position to which the weight has been turned.

The weight 10 is loaded on one side only (see Figure IV), and if this side be turned inwardly the pendulum will swing slightly outwardly, while if the loaded side be turned outwardly, the pendulum will swing inwardly to bring its center of mass to the proper horizontal distance from its point of support. The graduations 33 and the pointer 32 are so arranged with reference to the loading of the weight that if the tendency of the scale is to weight "fast" at full capacity the tendency may be corrected by turning the weight to bring the letter S, which appears at one end of the series of graduations (see Figure II), nearer to the pointer 32.

In weighing mechanism which, unlike that of applicant's device, includes levers, one or more of the levers is usually equipped with a loading box in order that the scale may be balanced with proper initial pull on the counterbalancing mechanism. In the applicant's device the loading box is placed in the bail 16 of the support for the commodity-receiving platter and is provided with a suitable cover 34. The ring 17 of the support for the commodity-receiving platter is so constructed that it may be inverted to accommodate a pan instead of a platter by removing the nuts 35.

The rack 22 is connected to the compensating frame 20 by means of a shock absorbing connection 36 which is clamped by a nut 37 to the lower end of a sleeve 38 within which the upper end of the rack bar is adjustably mounted. The rack bar is provided with a head 39 between which and a shoulder 40 in the sleeve 38 is interposed an expansive coil spring 41. A plug 42 is fixed by means of a retaining screw 43 in the upper end of the sleeve 38, and threaded through the plug 42 is an adjusting screw 44. When the adjusting screw 44 is turned further into the plug 42, the rack bar is moved downwardly against the force of the spring 41. When the adjusting screw 44 is turned out of the plug 42, the rack bar is moved upwardly by the force of the spring 41, the spring 41 further serving at all times to hold the upper end of the rack bar in firm engagement with the lower end of the adjusting screw 44 and thus prevent lost motion. The portion of the rack bar which is received within the sleeve 38 is provided with a groove 45 which is engaged by the point of a screw 46. The rack bar is thus prevented from turning within the sleeve 38, and, when it has been properly adjusted, it may be locked in place by means of the screw 46. The adjusting screw 44 may be manipulated by inserting a screw driver through the opening 47 in the upper side of the housing 1. Since adjustment of the rack bar causes the pinion 23 and shaft 24 to turn and thus swings the hands 25 over the charts 2, a very convenient means is provided for bringing the hands into proper indicating position.

The vibration of the scale is controlled by a dash pot device, including the dash pot 14 which forms a part of the means connecting the commodity-receiver and the load-counterbalancing mechanism. The dash pot 14 consists of an upper section 48, which is connected by means of the ribbons 13 to the pendulum power sectors 12, and a lower section 49, which is connected by means of the hook 15 to the bail 16 of the support for the commodity-receiving platter. The dash pot is guided in its up and down movement by stems 50 and 51 which are connected to the upper and lower sections of the dash pot. The stem 50 contains an axial bore 52 through which is passed a plunger stem 53 carrying at its lower end a dash pot plunger 54. The plunger stem 53 is surrounded by a sleeve 55, at the lower end of which is mounted a bell-shaped member 56 adapted when moved downwardly toward the plunger 54 to restrict the flow of fluid through openings in the plunger.

An expansive spring 57 tends to lift the bell-shaped member 56 away from the plunger, but such movement away from the plunger is prevented by engagement of a collar 58, which is fixed to the upper end of the sleeve 55, with the lower end of an adjusting rod 59 that is threaded through a collar 60 fixed upon the upper end of the plunger rod 53. The upper end of the adjusting rod 59 extends through the upper side of the housing 1 and is provided with a knurled head 62, so that the bell-shaped member 56 may be easily moved toward or away from the plunger 54. It will be understood that when the knurled head 62 is turned to move the bell-shaped member 56 toward the plunger 54, the flow of liquid through openings in the plunger is retarded and the damping effect of the dash pot mechanism is increased, and that when the knurled head 62 is turned in the opposite direction to move the bell-shaped member away from the plunger, the fluid is permitted to flow more freely through the openings in the plunger and the damping effect of the dash pot device is decreased. By means of this adjustment changes in the consistency of the fluid may be compensated for.

The dash pot may be filled with a suitable fluid by removing the plate 63 from the lower side of the housing, unscrewing the lower section 49 of the dash pot, and removing it through the lower side of the housing. The stem 51 and the opening through which it passes are of noncircular cross section, so that when the section 49 of the dash pot has been screwed into place and the plate 63 fastened to the housing, the section 49 cannot become accidentally unscrewed.

Scales of the hanging type find their widest use under conditions in which they are subjected to much swinging, and they are often used under conditions such that they must be taken down at night. The liquid is prevented from splashing out of the bore 52 or from running out of it, should the scale be turned over, by means of a tubular dam 64 which extends inwardly from the bore 52.

I have also provided means for locking the load-counterbalancing and indicating mechanism against movement so that the pendulums cannot flop about when the scale is hung from a moving vehicle or cannot fall out of place when the scale is turned over and moved about. Each of the pendulums is provided with an inwardly extending arm 65 containing an opening which is adapted to receive the lower end of a vertically movable locking rod 66, the lower end of each of the rods being tapered, as shown in Figure II, to facilitate its engagement with the arm 65. The rods 66 are guided through lugs 68 which project inwardly from two of the posts 3 and are secured at their upper ends to a cross-head 69, which in turn is secured to the lower end of a vertically movable rod 70. The rod 70 passes upwardly through a sleeve 71 which is threaded into an opening in the upper side of the housing 1, the upper end of the rod 70 being swiveled to a yoke 72 which is equipped with an eye 73 adapted to engage a supporting hook (not shown).

As shown in Figure VII, an expansive spring 74 is interposed between the cross-head 69 and the lower end of the tube 71. When the scale is hung by means of the eye 73 upon a supporting hook, the weight of the scale compresses the spring 74, and the lower ends of the rods 66 are held out of engagement with the arms 65 that extend inwardly from the pendulums. As soon, however, as the scale is lifted so that it is no longer supported through the eye 73 and rod 71, the cross-head 69 and rod 66 are forced downwardly by the expansive spring 74 so that their lower tapered ends pass into the openings in the arms 65 and thus firmly lock the pendulums and the parts connected therewith against movement. A stud 75 projects from one side of the rod 70 through a vertical slot in the tube 71 and thus prevents the rod from rotating within the tube. The stud 75 also co-operates with a spiral cam formed upon the lower end of a sleeve 76 which is rotatably mounted upon the tube 71 and is provided with a fluted knob 77 so that it may be manually turned. If, when the scale is supported through the eye 73 and the rod 70, it is desired to lock the pendulums, the knob 77 may be turned, thus, by reason of the action of the spiral cam on the stud 75, causing the tube 71, the housing of the scale, and the pendulums and other parts supported therein to move upwardly relatively to the rod 70, cross-head 69, and locking rods 66 and the openings in the arms 65 to pass over the tapered lower ends of the locking rods 66. When the sleeve 76 reaches its limit of upward movement, a notch 78 slips over the stud 75, so that the sleeve 76 is retained against accidental retrograde movement.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. A load-counterbalancing pendulum for weighing scales comprising, in combination, a pendulum stem and a single unitary load-counterbalancing pendulum weight, the center of mass of said pendulum weight lying without the axis of said stem, said pendulum weight being so constructed that said center of mass may be swung about said axis.

2. A load-counterbalancing pendulum for weighing scales comprising, in combination, a pendulum stem and a pendulum weight, the exterior of said pendulum weight being symmetrical with respect to the axis of said pendulum stem, the interior of said pendulum weight being loaded eccentrically so that the center of mass of said pendulum weight lies without the axis of said stem, and means whereby said pendulum weight may be revolved on said stem.

3. A load-counterbalancing pendulum for weighing scales comprising, in combination, a power sector, a pendulum stem, and a pendulum weight, said pendulum weight being in appearance symmetrical with respect to the axis of said stem, said pendulum weight being rotatable about the axis of said stem, the center of mass of said weight lying without the axis of said stem.

4. A load-counterbalancing pendulum for weighing scales comprising, in combination, a power sector, a pendulum stem fixed thereto, and a pendulum weight rotatably mounted on said stem, said pendulum weight being in appearance symmetrical with respect to the axis of said stem, said pendulum weight being so loaded that its center of mass lies at one side of the axis of said stem.

5. A load-counterbalancing pendulum for weighing scales comprising, in combination, a fulcrum sector, a power sector eccentric with respect to said fulcrum sector, a pendulum stem fixed with respect to said sectors, a pendulum weight mounted on said stem, the center of mass of said pendulum weight lying without the axis of said stem, and means for swinging the center of mass about said axis.

6. A load-counterbalancing pendulum for weighing scales comprising, in combination, a pendulum center having eccentric fulcrum and power sectors, a pendulum stem fixed to said pendulum center, and a pendulum weight rotatably mounted on said pendulum stem, said pendulum weight being loaded so that its center of mass lies at one side of the axis of said stem.

7. A load-counterbalancing pendulum for weighing scales comprising, in combination, a pendulum center having eccentric fulcrum and power sectors, a pendulum stem fixed to said pendulum center, a pendulum weight mounted on said pendulum stem having its center of mass lying without the axis of said stem, and a pointer and a series of graduations cooperating to indcate the position of said center of mass with respect to the axis of said stem.

8. A load-counterbalancing pendulum for weighing scales comprising, in combination, a pendulum center having eccentric power and fulcrum sectors, a pendulum stem fixed to said pendulum center, a pendulum weight rotatably mounted on said pendulum stem and having its center of mass lying without the axis of said stem, a pointer fixed with respect to said stem, co-operating indicia on said pendulum weight, and means for locking said weight in fixed position relative to said stem.

9. In a weighing scale, in combination, a pair of oppositely swinging load-counterbalancing pendulums each comprising a pendulum stem and a single unitary load-counterbalancing pendulum weight, the center of mass of said pendulum weight lying without the axis of said stem, said pendulum weight being so constructed that said center of mass may be swung about said axis.

10. In a weighing scale, in combination, a pair of oppositely swinging load-counterbalancing pendulums each comprising a pendulum stem and a pendulum weight, the exterior of said pendulum weight being symmetrical with respect to the axis of said pendulum stem, the interior of said pendulum weight being loaded eccentrically so that the center of mass of said pendulum weight lies without the axis of said stem, and means whereby said pendulum weight may be revolved on said stem.

11. In a weighing scale, in combination, a pair of oppositely-swinging load-counterbalancing pendulums, each comprising a fulcrum sector, a power sector eccentric with respect to said fulcrum sector, a pendulum stem fixed with respect to said sectors, and a pendulum weight mounted on said stem, the center of mass of said pendulum weight lying without the axis of said stem, said parts being so constructed and arranged that the center of mass may be swung about said axis.

12. In a weighing scale, in combination, a pair of oppositely-swinging load-counterbalancing pendulums, each comprising a pendulum center having eccentric fulcrum and power sectors, a pendulum stem fixed to said pendulum center, and a pendulum weight rotatably mounted on said pendulum stem, said pendulum weight being loaded so that its center of mass lies at one side of the axis of said stem.

13. In a weighing scale, in combination, a pair of oppositely-swinging load-counterbalancing pendulums, each comprising a pendulum center having eccentric fulcrum and power sectors, a pendulum stem fixed to said pendulum center, a pendulum weight mounted on said pendulum stem having its center of mass lying without the axis of said stem, and a pointer, one of the other of said members having a series of graduations co-operating with said pointer to indicate the position of said center of mass with respect to the axis of said stem.

14. In a weighing scale, in combination, a pair of load-offsetting pendulums, each comprising a pendulum center having eccentric power and fulcrum sectors, a pendulum stem fixed to said pendulum center, a pendulum weight rotatably mounted on said pendulum stem and having its center of mass lying without the axis of said stem, a pointer fixed with respect to said stem, co-operating indicia on said pendulum weight, and means for locking said weight in fixed position relative to said stem.

15. In a weighing scale of the hanging type, in combination, weighing mechanism, means for automatically locking said weighing mechanism in inoperative position when said scale is removed from its support, and means for manually operating said locking means while said scale is hanging on its support.

16. In a weighing scale of the hanging type, in combination, weighing mechanism, means for automatically locking said weighing mechanism when said scale is removed from its support, said means including locking members, an expansive spring adapted to force said locking members into locking position, means whereby said spring is compressed by the weight of the scale when said scale is hung upon its support, and manually operating means for moving said locking members into locking position.

17. In a weighing scale of the hanging type, in combination, a frame, a load-counterbalancing unit, said unit having an opening therein, a locking member adapted to engage in said opening, means for automatically engaging said member in said opening when said scale is removed from its support, and manually operable means for moving said member into said opening.

18. In a weighing scale of the hanging type, in combination, a load-counterbalancing unit, said load-counterbalancing unit having an opening therein, a longitudinally movable rod having a tapered end adapted to engage in said opening, an expansive spring for forcing said tapered end into engagement with said opening, and means whereby said tapered end is withdrawn from said opening against the force of said spring when said scale is hung upon its support.

19. In a weighing scale of the hanging type, in combination, a load-counterbalancing unit, said load-counterbalancing unit having an opening therein, a longitudinally movable rod having a tapered end adapted to engage in said opening, an expansive spring for forcing said tapered end into engagement with said opening, means whereby said tapered end is withdrawn from said opening against the force of said spring when said scale is hung upon its support, and manually operable means for forcing said tapered end into said opening.

20. In a weighing scale of the hanging type, in combination, a load-counterbalancing pendulum, an arm projecting therefrom, said arm having an opening therein, a longitudinally movable rod having a tapered end adapted too engage in said opening, means for automatically moving said rod to engage said tapered end in said opening when the scale is removed from its support, and manually operable means for longitudinally moving said rod to engage said tapered end in said opening.

21. In a weighing scale, in combination, a frame, load-counterbalancing mechanism supported thereby, means for hanging said scale upon a support including a longitudinally movable rod, an expansive spring adapted to be compressed by movement of the rod when said scale is hung from its support and by its exansive force to move the rod longitudinally when said scale is removed from its support, locking means connected to said rod and adapted to be operated thereby, and means for manually moving said rod to operate said locking means, comprising a cam pivotally connected to said frame and arranged to act upon said rod.

22. In a weighing scale, in combination, a frame, load-counterbalancing mechanism supported thereby, means for hanging said scale upon a support including a longitudinally movable rod, an expansive spring adapted to be compressed by movement of the rod when said scale is hung upon its support and by its expansive force to move the rod longitudinally when said scale is removed from its support, locking means connected to said rod and adapted to be operated thereby, and means for manually moving said rod to operate said locking means, comprising a sleeve surrounding said rod and having a cam-shaped lower end, and a stud projecting from said rod and adapted to be acted upon by said cam.

23. In a weighing scale, in combination, a housing, load-counterbalancing mechanism supported therein, a dash pot damping device including a movable dash pot connected to said load-counterbalancing mechanism, a stationary plunger within said dash pot connected to said frame, said plunger having openings to permit flow of fluid therethrough, and means for controlling the rate of flow through said openings, said means including a manipulating knob located outside of said housing.

24. In a weighing scale, in combination, a housing, load-counterbalancing mechanism supported therein, a movable dash pot connected to said load-counterbalancing mechanism, a plunger within said dash pot and connected to said housing, means whereby fluid in said dash pot is permitted to by-pass said plunger, and means for regulating said by-pass means including a manipulating knob located outside said housing.

LEWIS CALVIN WETZEL.